United States Patent
Trivedi et al.

(10) Patent No.: US 10,697,509 B2
(45) Date of Patent: Jun. 30, 2020

(54) DISC BRAKE ROTORS WITH LATTICE STRUCTURES

(71) Applicant: Autodesk, Inc., San Rafael, CA (US)

(72) Inventors: Abhishek Trivedi, Pleasant Hill, CA (US); Bhupendra Lodhia, Stevenage (GB); Gonzalo Martinez, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 307 days.

(21) Appl. No.: 15/786,275

(22) Filed: Oct. 17, 2017

(65) Prior Publication Data

US 2019/0113091 A1    Apr. 18, 2019

(51) Int. Cl.
| | |
|---|---|
| *F16D 65/12* | (2006.01) |
| *B29C 64/386* | (2017.01) |
| *B29C 64/40* | (2017.01) |
| *B33Y 80/00* | (2015.01) |
| *F16D 65/02* | (2006.01) |
| *B33Y 50/00* | (2015.01) |
| *F16D 65/847* | (2006.01) |

(52) U.S. Cl.
CPC .......... *F16D 65/128* (2013.01); *B29C 64/386* (2017.08); *B29C 64/40* (2017.08); *B33Y 50/00* (2014.12); *B33Y 80/00* (2014.12); *F16D 65/847* (2013.01); *F16D 2065/132* (2013.01); *F16D 2065/1328* (2013.01); *F16D 2250/0007* (2013.01)

(58) Field of Classification Search
CPC .. F16D 65/847; F16D 65/128; F16D 65/0006; B23K 1/0018; F03D 3/068; F03D 3/005; F03D 7/0264
See application file for complete search history.

(56) References Cited

U.S. PATENT DOCUMENTS

| | | | |
|---|---|---|---|
| 4,083,435 A |   | 4/1978 | Gallus et al. |
| 5,954,165 A | * | 9/1999 | Kito ................. F16D 65/0006 |
| | | | 188/218 XL |

(Continued)

OTHER PUBLICATIONS

Unknown author, "About the Optimization Utility—Netfabb—Autodesk Knowledge Network," (Oct. 11, 2017) [online] (retrieved from https://knowledge.autodesk.com/support/netfabb/learn-explore/caas/CloudHelp/cloudhelp/2017/ENU/NETF-Utility-Optimization/files/GUID-F9E8CC95-6E45-44DD-8836-049557E71F2A-htm.html), 4 pages.

*Primary Examiner* — Kandasamy Thangavelu
(74) *Attorney, Agent, or Firm* — Fish & Richardson P.C.

(57) ABSTRACT

Methods, systems, and apparatus, including medium-encoded computer program products, for designing and manufacturing rotors for disc brake systems and apparatus include, in one aspect, a method including: placing a lattice structure in a ventilation space within a 3D model to create more internal surface area within a disc brake rotor between inner and outer rotor discs; adjusting a number of lattice unit cells for the lattice structure in different regions of the 3D model between the rotor discs to increase air turbulence in the ventilation space; adjusting one or more thicknesses of beams forming the lattice structure in different regions of the 3D model between the rotor discs to prevent structural failure under predefined loading conditions; and providing an updated version of the 3D model of the disc brake rotor that incorporates the lattice structure after adjustment of the number of lattice unit cells and the beam thickness(es).

20 Claims, 5 Drawing Sheets

(56) References Cited

U.S. PATENT DOCUMENTS

| | | | |
|---|---|---|---|
| 6,161,660 A * | 12/2000 | Suga | F16D 65/0006 188/218 XL |
| 6,808,050 B2 | 10/2004 | Lehmann et al. | |
| 7,191,875 B2 | 3/2007 | Kurimoto et al. | |
| 8,408,366 B2 | 4/2013 | Kono et al. | |
| 9,506,515 B2 | 11/2016 | White et al. | |
| 9,587,690 B2 | 3/2017 | Boffelli | |
| 9,657,797 B2 | 5/2017 | Buxton et al. | |
| 2008/0142319 A1 * | 6/2008 | Manter | B23K 1/0018 188/218 XL |
| 2015/0021128 A1 * | 1/2015 | White | F16D 65/128 188/218 XL |
| 2015/0354648 A1 * | 12/2015 | Noriega Gonzalez | F16D 65/847 188/218 XL |
| 2016/0298708 A1 * | 10/2016 | Torres Gutierrez | F16D 65/128 |

* cited by examiner

DISC BRAKE ROTORS WITH LATTICE STRUCTURES

BACKGROUND

This specification relates to computer aided design and manufacture of disc brakes for vehicles, and in particular to using three dimensional (3D) modeling and simulation programs and additive manufacturing to design and manufacture rotors for disc brake systems and apparatus.

Disc brakes are designed for structural support but also so as to cool down quickly since the disc brake heats up rapidly during braking. Many disc brake failures are not due to structural failure but due to thermal failure caused by the high temperatures. This can especially be true for the disc brakes used on racing and sports cars. In order to increase the rate of cooling, a traditional rotor includes an inboard disc and an outboard disc, which are connected by vanes so as to form grooves between the two discs, where air can travel through these grooves to improve cooling of the disc brake rotor. For example, U.S. Pat. No. 4,083,435 describes a brake disc with improved ventilation cooling generated using radially running channels located in the interior of the brake ring. In addition, more recently and in the context of heavy-duty vehicles, U.S. Pat. No. 9,506,515 describes a disc brake rotor that uses pins between the inboard and outboard discs of the rotor so as to increase the air flow between the discs.

SUMMARY

This specification describes technologies relating to computer aided design and manufacture of disc brakes for vehicles, and in particular to using three dimensional (3D) modeling and simulation programs and additive manufacturing to design and manufacture rotors for disc brake systems and apparatus.

In general, one or more aspects of the subject matter described in this specification can be embodied in one or more methods that include: placing a lattice structure in a ventilation space within a three dimensional model of a disc brake rotor to create more internal surface area within the disc brake rotor between an inner disc of the rotor and an outer disc of the rotor; adjusting a number of lattice unit cells for the lattice structure in different regions of the three dimensional model of the disc brake rotor between the inner disc and the outer disc of the rotor to increase air turbulence in the ventilation space within the disc brake rotor; adjusting one or more thicknesses of beams forming the lattice structure in different regions of the three dimensional model of the disc brake rotor between the inner disc and the outer disc of the rotor to prevent structural failure of the disc brake rotor under predefined loading conditions; and providing an updated version of the three dimensional model of the disc brake rotor that incorporates the lattice structure after adjustment of the number of lattice unit cells and the one or more thicknesses of beams forming the lattice structure.

According to another aspect, a system can include: a data processing apparatus including at least one hardware processor; and a non-transitory computer-readable medium encoding instructions configured to cause the data processing apparatus to perform operations including placing a lattice structure in a ventilation space within a three dimensional model of a disc brake rotor to create more internal surface area within the disc brake rotor between an inner disc of the rotor and an outer disc of the rotor, adjusting a number of lattice unit cells for the lattice structure in different regions of the three dimensional model of the disc brake rotor between the inner disc and the outer disc of the rotor to increase air turbulence in the ventilation space within the disc brake rotor, adjusting one or more thicknesses of beams forming the lattice structure in different regions of the three dimensional model of the disc brake rotor between the inner disc and the outer disc of the rotor to prevent structural failure of the disc brake rotor under predefined loading conditions, and providing an updated version of the three dimensional model of the disc brake rotor that incorporates the lattice structure after adjustment of the number of lattice unit cells and the one or more thicknesses of beams forming the lattice structure.

According to another aspect, a disc brake rotor includes: a mount configured to be coupled with an axle of a vehicle; an inner disc and an outer disc coupled with the mount; and a lattice coupled between the inner disc and the outer disc; wherein the lattice includes a lattice unit that has been reproduced multiple times to form the lattice between the inner disc and the outer disc, the lattice unit including beams that cross each other within a lattice unit cell; wherein a density of the lattice varies along at least one dimension of the disc brake rotor so as to improve heat convection properties of the disc brake rotor; and wherein a density of each of two or more lattice unit cells of the lattice varies to provide additional structural support where needed.

Particular embodiments of the subject matter described in this specification can be implemented to realize one or more of the following advantages. Rotor designs can be improved by adding a lattice structure and adjusting the lattice structure to facilitate convective heat dissipation within the rotor. The amounts of surface area and air turbulence within a ventilation space inside a rotor can be adjusted to improve heat dissipation properties, which can result in significantly improved disc brake designs employing such rotors. By minimizing air stagnation within the rotor, more air flow turbulence and thus cooling effect can be achieved with the rotor design. Moreover, the systems and techniques described are also applicable to other devices that pass fluids, such as water or air, through an internal structure to achieve heat dissipation, such as heat exchangers, as well as to effect light-weighting to improve the strength to weigh ratio of such devices.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
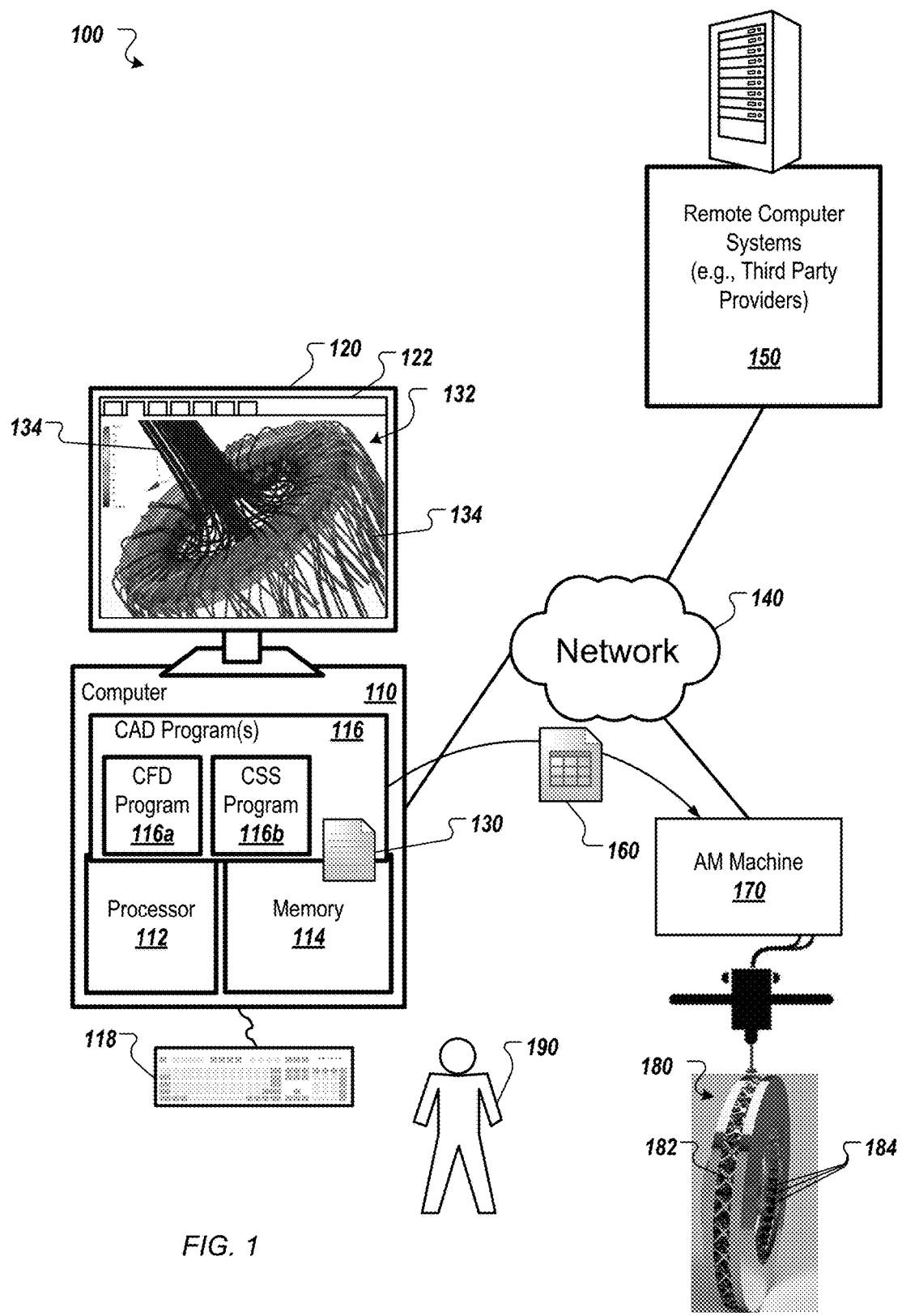
FIG. 1 shows an example of a system usable to design and manufacture lattice structures in rotors for disc brake systems and apparatus.

FIG. 1 shows an example of a system 100 usable to design and manufacture lattice structures in rotors for disc brake systems and apparatus. In the example shown, an additive manufacturing machine is used, but the invention is not limited to use with a particular type of manufacturing system. For example, the systems and techniques described herein can be used with various types of additive manufacturing (AM), three dimensional (3D) printing, subtractive manufacturing (SM), investment casting, etc.

A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more 3D modeling and simulation programs such as a computer aided design (CAD) program 116, which can run locally on computer 110, remotely on a computer of one or more remote computer systems 150 (e.g., one or more third party providers' one or more server systems accessible by the computer 110 via the network 140) or both locally and remotely. The CAD program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the one or more 3D modeling and simulation programs to create and/or load a 3D model of a rotor (e.g., for a disc brake of a vehicle). This can be done using known graphical user interface tools. The 3D model can be defined in the computer using various known 3D modeling formats, such as using solid models (e.g., voxels) or surface models (e.g., B-Rep (Boundary Representation), surface meshes). The user 190 can also operate to system 100 to modify the 3D model of the rotor by adding and adjusting a lattice structure in the rotor design, as described in detail below. In addition, the user 190 can interact with the one or more 3D modeling and simulation programs to simulate operation of the rotor, including the added lattice structure, using the data of the 3D model.

For example, in some implementations, the one or more 3D modeling and simulation programs include a computational fluid dynamics (CFD) simulation program 116a, e.g., AUTODESK® CFD software, available from Autodesk, Inc., of San Rafael, Calif., or ANSYS FLUENT® software, available from ANSYS, Inc., of Canonsburg, Pa., or SOLIDWORKS® Flow Simulation software, available from Dassault Systems Solidworks Corporation, of Waltham, Mass. The CFD program 116a can be a standalone software application, or be integrated with another software application, such as CAD program 116. The user 190 or a program component of the system 100 can operate the CFD program 116a to simulate operation of the rotor using the 3D model, and in particular, simulate flow of air through the rotor. Note that disc brakes are typically designed to include some form of air channels within the rotor of the disc brake to facilitate air cooling of the rotor during operation. The simulation of air flow through the rotor, including the added lattice structure, generates data that represents expected air turbulence within the rotor.

For example, as shown in FIG. 1, a representation 132 of a 3D model of a rotor for a disc brake (which is but one example of many possible rotor parts) is displayed in the UI 122 and shows numerical approximation of air flow 134 through the rotor as it spins. In particular, data is generated that represents the expected air flow 134 through a lattice structure that has been added to the rotor. Note that the granularity of the computer simulation should be sufficiently small (e.g., the mesh of the 3D model should be fine enough) that airflow through the small spaces between the beams of the lattice structure is not ignored. Further, using the data generated by the simulation, the lattice structure can be modified (e.g., adjusted, moved, reoriented, reconfigured, or a combination of these) to improve the heat dissipation characteristics of the rotor design. Note that the temperature of the rotor rises initially during application of the brake, and then drops dramatically due to forced convection within the rotor (e.g., air forced into the rotor by fins built into the disc brake design).

Using the data from the air flow simulation, the user 190 or a program component of the system 100 modifies the lattice structure in one or more regions of the rotor design to improve thermal heat dissipation by the rotor by adjusting a density of the lattice to introduce additional air turbulence within the rotor and also increase the internal surface area within the rotor. In addition, the simulation can be repeated with the adjusted lattice to generate updated data, and the 3D model can be redesigned as needed to improve cooling performance and generate a complete 3D model of a rotor with an added lattice structure that facilitates heat convection within the rotor. By improving the convection properties (and thereby the cooling properties) of the rotor, an improved disc brake can be realized. Adjusting lattice density within the rotor causes an increase in surface area within the rotor interior, as well as an increase in the amount of air turbulence within the rotor interior, both of which can improve the thermal heat dissipation properties of the rotor.

The simulation can identify one or more regions of the ventilation space within the rotor where air flows relatively freely, e.g., the level of air turbulence is below a first predefined threshold, and the density of the lattice can be increased in such areas. This means that the size(s) of the unit cells in which beams (or equivalently, struts) are arranged to form the lattice are reduced, i.e., the number of lattice cells per unit volume is increased. The density of the lattice is increased in these region(s) with free flow of air since smaller cell sizes generally translate into more surface area of the beams forming the lattice and also more air turbulence caused by the increased number of smaller lattice cells.

In addition, the simulation can identify one or more regions of the ventilation space within the rotor where air tends to stagnate, e.g., the level of air turbulence is above a second predefined threshold, and the density of the lattice can be decreased in such areas. This means that the size(s) of the unit cells in which beams are arranged to form the lattice are increased, i.e., the number of lattice cells per unit volume is decreased. The density of the lattice is decreased in these region(s) since stagnant air can reduce heat convection in the rotor and thus larger cell sizes are used to allow the air to flow more freely. In general, a minimum amount of air turbulence is desirable within the rotor to obtain effective heat removal, and the lattice density can be increased to create more lattice surface area within the rotor up to a point where air turbulence becomes too high, which can result in stagnating air and thus less heat dissipation, at which point, the lattice density can be decreased to balance the amount of air turbulence with the amount of internal surface area for the ventilation space within the rotor.

Once the thermal adjustment of the lattice density is completed, e.g., customizing lattice density through a volume of the 3D model of the rotor using air flow data from the CFD program 116a (and potentially also using thermal gradient data from this or another computational simulation), the one or more 3D modeling and simulation programs can be used to simulate application of expected loading conditions on the rotor (e.g., during operation in a disc brake system or apparatus) followed by structural analysis and adjustment. The structural adjustment can include adjusting the density of lattice unit cells in view of the stress analysis obtained from the simulation. For a given unit cell of a lattice, increasing the thickness of the beams of the lattice within that cell results in an increase in density of material within that cell as well as increased structural strength for the lattice in that cell. Likewise, for a given unit cell of a lattice, decreasing the thickness of the beams of the lattice within that cell results in a decrease in density of material within that cell as well as decreased structural strength for the lattice in that cell. In some implementations, the beams are only thickened where needed to prevent structural failure. In some implementations, the beams are both thickened and thinned as appropriate to optimize the structural design in view of expected loading conditions during user of the rotor (e.g., during operation in a disc brake system or apparatus). In addition, the lattice is distributed radially to maintain rotational balance.

In some implementations, the one or more 3D modeling and simulation programs include a computational structural simulation (CSS) program 116b, e.g., NETFABB® software, available from Autodesk, Inc., of San Rafael, Calif., or OPTISTRUCT software, available from Altair Engineering, Inc., of Troy, Mich., or BETATYPE software, available from Betatype Ltd. at www.betaty.pe. The CSS program 116b can be a standalone software application, or be integrated with another software application, such as CAD program 116. The user 190 or a program component of the system 100 can operate the CSS program 116b to simulate (using the 3D model data) the structural performance of the rotor and to modify the lattice structure design so as to avoid stress and buckling failures. In particular, the user 190 or a program component of the system 100 can operate the CSS program 116b to adjust beam thicknesses within the lattice portion of the 3D model based on the expected loading conditions.

Note that the loading conditions can impact parts of the rotor design (e.g., the hub) other than the lattice structure, so the structural optimization software should be run to increase the thickness of individual beams as well to ensure the overall rotor design doesn't break. In some implementations, this is an automated process performed entirely by the CSS program 116b. In some implementations, the adjustment of lattice density to improve thermal convection and heat dissipation is also performed using the CSS program 116b. Moreover, the system 100 can be used to perform the lattice density adjustment (for thermal convection and heat dissipation) and the lattice unit cell density adjustment (for structural optimization) more than once for the same 3D model, including an iterative process that alternates between thermal adjustment and structural adjustment of the 3D model of the rotor.

Once the modifications of the 3D model of the rotor are completed, the 3D model can be prepared for additive manufacturing of a rotor 180. The 3D model and its lattice structure can be stored as a document 130 and/or used to generate another representation of the model (e.g., an .STL file for additive manufacturing) with the lattice structure included therein. This can be done upon request by the user 190, or in light of the user's request for another action, such as sending the 3D model to an AM machine 170, or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the one or more 3D modeling and simulation programs (e.g., CAD program 116) can create a digital representation of the 3D model of the rotor, including the lattice structure, and provide a document 160 (of an appropriate format) to the manufacturing machine 170 to create the rotor 180, including lattice structure 182 to facilitate cooling of the rotor with high relative structural integrity for the rotor. In the example shown in FIG. 1, the rotor 180 includes fins 184 placed around an internal circumference of the rotor 180 to direct air through the lattice structure 182 in the ventilation space between the inner and outer discs of the rotor 180.

The manufacturing machine 170 can employ one or more additive manufacturing techniques, such as granular techniques (e.g., Selective Laser Sintering (SLS) and Direct Metal Laser Sintering (DMLS)), extrusion techniques (e.g., Fused Deposition Modelling (FDM)), or subtractive or any other computer aided manufacturing methods. In addition, the user 190 can save or transmit the 3D model of the rotor 180 for later use. For example, the 3D modeling program 116 can store the document 130 that includes the 3D model and its lattice structure.

Figure 2:
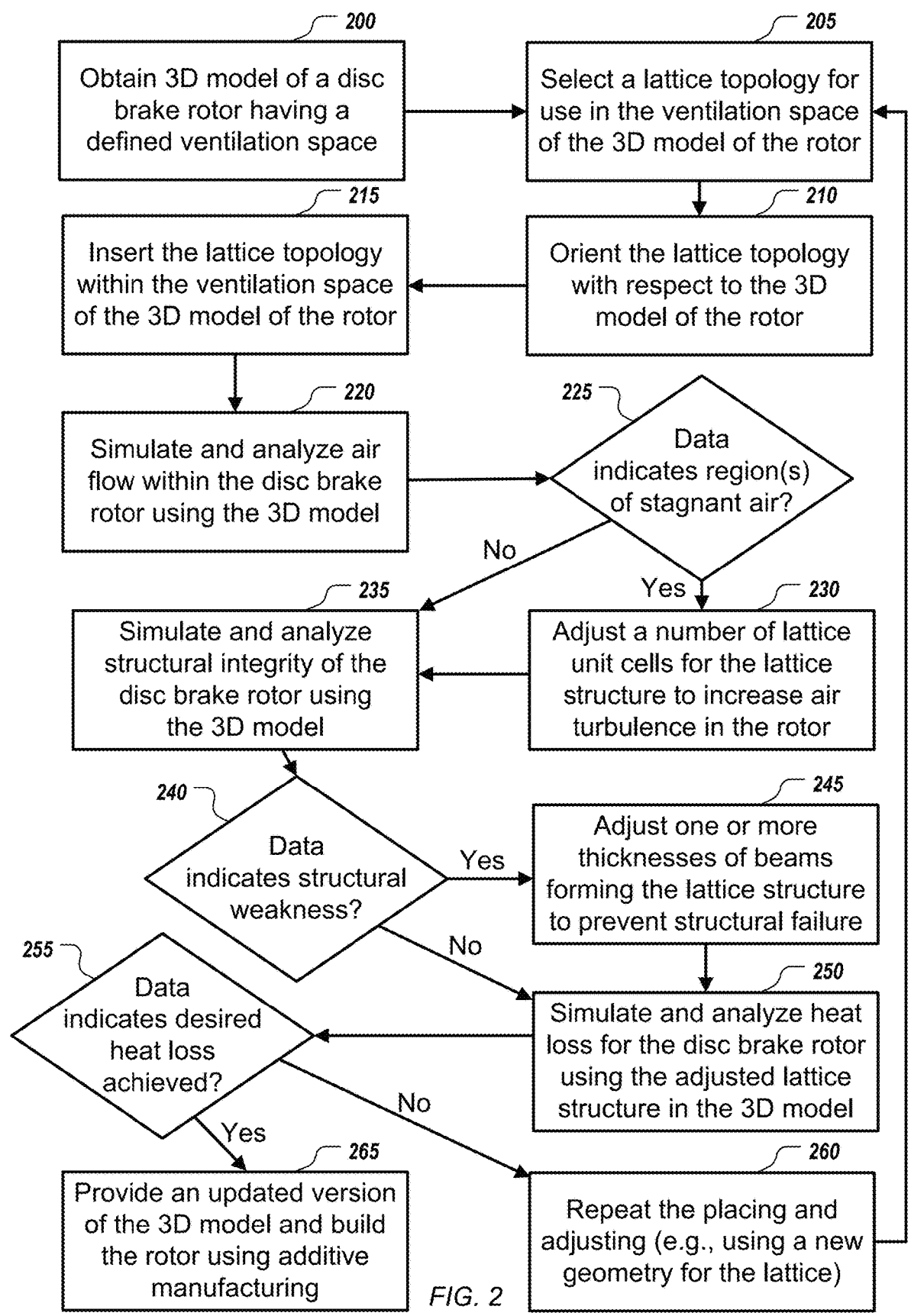
FIG. 2 shows an example of a process to design and manufacture rotors including lattice structures for disc brake systems and apparatus.

FIG. 2 shows an example of a process to design and manufacture rotors including lattice structures, e.g., for disc brake systems and apparatus. A 3D model of a rotor (e.g., a disc brake rotor) is obtained 200, where the rotor has a defined ventilation space. This can include generating the 3D model using a 3D modeling program, as described above, and/or loading or receiving the 3D model from a storage device or another computer. The ventilation space is defined as one or more volumes within the rotor, between an inner disc side and an outer disc side of the rotor, where empty space can be included to facilitate air cooling of the rotor. The ventilation space can be defined in the computer using various known 3D modeling formats, such as using solid models (e.g., voxels) or surface models (e.g., B-Rep (Boundary Representation), surface meshes), the ventilation space definition can be received as input or defined by the user operating the computer, and the ventilation space indicates which portions of the rotor design may be replaced by lattice structure. Note that the ventilation space can encompass both solid and non-solid portions already defined in the 3D model of the rotor, such as traditional vanes and corresponding grooves inside the rotor.

A lattice topology is selected 205 for use in the ventilation space of the 3D model of the rotor. The selected lattice topology should be one that ensures the rotor design will be manufacturable. Note that a lattice topology specifies a base lattice unit composed of beams that are arranged in a predefined manner within a lattice unit cell, where that lattice cell can be reshaped (e.g., resized and/or skewed) as needed and replicated to form a lattice structure. For some additive manufacturing techniques, the lattice topology should form a self-supporting lattice structure, such that no extra support material need be used during the manufacturing since such extra support material can be difficult to fully remove, which can impact the rotor's internal air turbulence along with overall balance and load bearing capacity in unpredictable ways. Self-supporting lattice topologies include the star topology and the X topology, which are discussed in further detail below. Moreover, in some implementations, different lattice topologies can be generated to affect the cooling ability of the design.

With a lattice topology selected (or predefined for a given application) a lattice structure is formed using the lattice topology and placed in the ventilation space within the rotor. In some implementations, the initial placement of the lattice structure within the ventilation space is at least partially arbitrary, and the lattice structure can be repositioned and/or reoriented as needed to meet specified design goals for the rotor. In some implementations, the initial placement is selected based on the design of the rotor. For example, the lattice structure can be placed within the rotor such that the center of rotation of the rotor aligns with the center of a lattice unit of the lattice structure that would be placed about the rotor center if this location where included in the ventilation space (i.e., a single common origin for the lattice structure placed within the rotor).

In addition, the placement of the lattice structure within the rotor can depend on how the rotor will be manufactured. For example, the lattice topology can be oriented 210 with respect to the 3D model of the rotor based on the planed orientation of the rotor when it is built using an additive manufacturing system. In the case of a self-supporting lattice structure, the lattice should be oriented with respect to 3D printing direction and capabilities of the additive manufacturing system to be used. For example, the X topology lattice should be initially oriented with its beams forming forty five degree angles with the horizontal plane of the additive manufacturing system to be used.

The lattice topology (selected or predefined) is then inserted 215 within the ventilation space of the 3D model of the rotor to form the lattice structure within the rotor. This involves replacing solid portions of the 3D model within the ventilation space with multiple copies of the lattice topology base unit. In some implementations, this insertion 215 uses a single common origin for the lattice structure placed within the rotor, as noted above. In some implementations, this insertion 215 uses different origins for the lattice in different parts of the ventilation space. For example, the ventilation space can include discrete solid regions, which are separated by empty spaces, between the inner and outer discs of the rotor. For each of these discrete solid regions, the center of the region can be used as the origin for the lattice structure within that region. Various options are available for the lattice insertion 215, but in general, the lattice should be inserted in a manner that will maintain rotational symmetry for the rotor once the solid portions in the ventilation space are replaced with lattice structure.

With the lattice structure inserted into the 3D model of the rotor, air flow within the rotor is simulated and analyzed 220 using the 3D model, including the lattice structure. This can involve using the CFD program 116a, as described above. The result of the simulation and analysis 220 is fluid turbulence data that indicates where air tends to flow freely and where air tends to stagnate within the rotor design. Note that air stagnation points within the rotor can limit the air circulation within the rotor, e.g., within a limited internal portion of the lattice, which can reduce the cooling effect achieved.

A check is made 225 as to whether the fluid turbulence data from the simulation and analysis 220 indicates one or more regions of stagnant air within the rotor design. For example, if the fluid turbulence data shows a flow rate that is below a threshold value in one more regions of the 3D model, these region(s) are indicated as needing adjustment. In some implementations, a flow above the Reynolds number 4000 are considered turbulent flow, but note that the adjustment of the lattice density need not specifically focus on maximizing the Reynolds number since Reynolds number will tend to improve automatically as stagnation areas are removed. In general, turbulence is encouraged to increase the rate of heat exchange. Thus, when region(s) of stagnant air are indicated 225, the lattice density is adjusted in these region(s) in accordance with the fluid turbulence data.

The number of lattice unit cells for the lattice structure is adjusted 230 in the indicated region(s) of the 3D model of the rotor to increase air turbulence in the ventilation space within the disc brake rotor. This involves reducing 230 the number of lattice unit cells for the lattice structure in the indicated region(s) of the 3D model. In addition, the adjustment can go both ways, such that the check 225 can include checking for one or more regions where the air flows too freely to achieve as much cooling as possible, and so the number of lattice unit cells for the lattice structure can be increased 230 in these other region(s) of the lattice structure. Note that the program used can be designed to allow specification of how many lattice cells go where inside the geometry represented by the 3D model, and so the number of lattice cells can be readily reduced in region(s) where there is stagnation in the fluid flow, and the number of lattice cells can be readily increased in region(s) where there is free flow in the fluid flow. Thus, after the adjustment 230, the number of lattice cells changes through the volume of the rotor.

As noted, the adjustment 230 can include both increasing the density of the lattice in some regions of the 3D model and decreasing the density of the lattice in other regions of the 3D model. In some implementations, the initial insertion 215 uses a low density lattice (large lattice unit cells) as a starting point, and then the adjusting 230 involves increasing the lattice density, as needed. In some implementations, the initial insertion 215 uses a high density lattice (small lattice unit cells) as a starting point, and then the adjusting 230 involves decreasing the lattice density, as needed. In any case, the goal of the adjusting 230 is to increase convective heat dissipation within the rotor.

After any needed lattice density adjustments are made, the structural integrity of the rotor is simulated and analyzed 235 using the 3D model, including the lattice structure. This can involve using the CSS program 116b, as described above. The results of the simulation and analysis 235 is data that indicates where structural failure may occur within the rotor (or a larger component in which the rotor will operate). A check of the data is made 240 to identify any structural weakness, and when such weakness is indicated, the process also adjusts 245 one or more thicknesses of beams forming the lattice structure in accordance with the computer simulation to prevent structural failure of the rotor (or the larger component in which the rotor will operate). In some implementations, this involves operating a computational structural simulation program to avoid stress and buckling failure, such as described above. Note that the adjustments 245 can be made on a per-beam basis, on a per-unit-cell basis, on a regional basis within the 3D model, or based on a combination of these.

In some implementations, each individual lattice unit is checked against the expected forces to be applied to the rotor, and beam thickness is increased where there is a potential failure. Note that structural failure can often happen for two reasons: pure stress failure because the stresses are too high, and geometric failure because the lattice was too thin with respect to the applied compressive load (a buckling failure). Thus, the lattice beams are thickened in different regions of the 3D model of the rotor, as needed, to avoid buckling failure in addition to stress failure.

In some implementations, once the density of the lattice cells is adjusted 230 and the thicknesses of lattice beams are adjusted 245, heat loss for the rotor (and potentially the larger system or apparatus with which the rotor will be used) is simulated and analyzed 250 using the adjusted lattice in the 3D model. This can involve using one or more of the 3D modeling and simulation programs described above. This simulation and analysis 250 constitutes a check against the original design to make sure the original performance has not been compromised, as well as to see what kind of performance gain has been achieved.

For example, a check of the heat loss can be made 255 against the original requirements for the rotor, e.g., using the CFD program 116a. This check 255 serves to validate a desired heat loss of the 3D model of the rotor after the adjusting 230 of lattice density and the adjusting 245 of lattice beam thicknesses. When the data indicates 255 that the desired heat loss has been achieved, an updated version of the 3D model of the rotor is provided 265. This can involve storing the updated 3D model (e.g., saving the 3D model to permanent storage) and/or outputting the updated 3D model to another program, or providing the updated 3D model to another component of the program effecting the process of FIG. 2. In some implementations, the process of FIG. 2 includes building 265 the rotor from the 3D model (either directly or indirectly by outputting the updated 3D model to a slicer program for processing to cause building 265 of the rotor) using additive manufacturing. For example, the 3D model of the rotor can be converted into a file of an appropriate format for a particular additive manufacturing machine, and this file can be sent to the additive manufacturing machine, such as described above in connection with FIG. 1.

If the check 255 against the original design requirements for the rotor indicates that the process should be repeated before finalizing the rotor design, e.g., because the original design requirements are not satisfied (e.g., the adjusting 245 causes air stagnation that leads to heat buildup within the rotor), or because further improvement in the design may be achievable (e.g., the heat loss achieved is compared against a previous iteration to see if a point of diminishing returns on improved convective heat dissipation has been reached), the updated 3D model can be processed further by repeating 260 one or more of the operations. In some implementations, the process returns to simulating and analyzing 220 air flow within the rotor. In some implementations, the process returns to inserting 215 the lattice topology to try a different placement (or a displacement from the initial placement) for the lattice within the rotor, or to switch between a universal lattice origin and separate lattice origins within the rotor design. In some implementations, an entirely new geometry is used for the lattice structure, and the process returns to selecting 205 a lattice topology. In any case, portions of the process of FIG. 2 can be repeated until the updated version of the 3D model of the rotor is validated 255 for the desired heat loss.

Figure 3A:
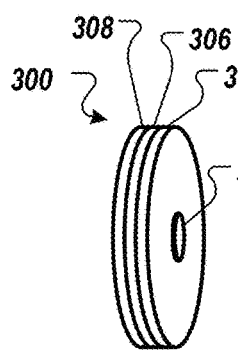
FIGS. 3A-3J show block diagrams of a rotor that is redesigned to include a lattice structure for thermal management in brake systems and apparatus.

FIGS. 3A-3J show block diagrams of a rotor that is redesigned to include a lattice structure for thermal management in brake systems and apparatus. FIG. 3A shows a perspective view of a disc brake rotor 300, which includes a mount 302 used to attach the rotor 300 to an axle of a vehicle. For example, the mount 302 can be a hub that is mechanically attached, e.g., via a sleeve, to one or more discs of the rotor 300. As another example, the mount 302 can be integrally formed as part of the rotor 300, e.g., by forming the rotor 300, including the mount 302, as a single piece in an additive manufacturing process (e.g., using DMLS). Various options for the mount 302, as well as for the mechanical structures used to attach the mount with the axle, are possible in light of the particular vehicle and application, as will be appreciated.

The rotor 300 includes three discs 304, 306, 308. An inner disc 304 faces an inboard side of the rotor, i.e., facing the axle of the vehicle when attached, and an outer disc 308 faces an outboard side of the rotor, i.e., facing away from the axle of the vehicle when attached. An intermediate disc 306 represents an internal portion of the rotor 300 where ventilation channels will allow air to flow through the rotor 300 and assist in cooling the rotor 300 during operation. Note that while these three items are described as "discs", they will typically not include a center portion, and so can also be understood as rings or flattened donut shapes. Also, since the rotor 300 can be integrally formed as a single piece (e.g., using an additive manufacturing process) the rotor 300 can also be understood as a single disc or ring with three separate disc/ring portions 304, 306, 308, and as used herein, the word "disc" includes each of these options.

Figure 3B:
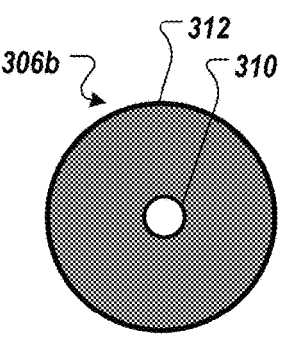

In any case, the intermediate disc 306 corresponds to the ventilation space defined for the rotor 300. FIG. 3B shows a side-on view of an intermediate disc 306b. In the example of FIG. 3B, the entire intermediate disc 306b, from an inner diameter/circumference 310 to an outer diameter/circumference 312, corresponds to the ventilation space defined for the rotor 300. Thus, all of the solid material of the rotor 300 in an interior slice 306 of the rotor disc is replaced with a lattice. In other cases, the ventilation space (in which solid material of the rotor 300 is replaced with lattice) is defined to be a sub-portion of the interior slice 306. As will be appreciated, various shapes (which may or may not extend to the inner diameter/circumference 310 and/or the outer diameter/circumference 312) can be defined within the interior slice 306 for use in lattice replacement.

Figure 3C:
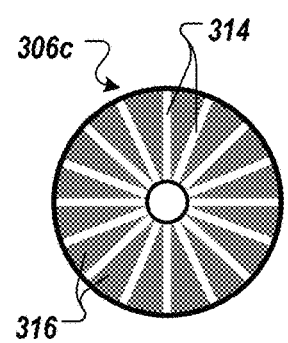
Figure 3D:
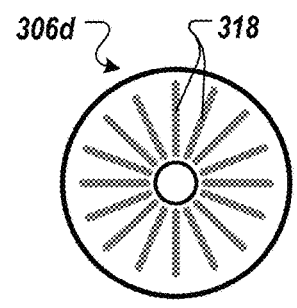

In some implementations, the interior slice 306 of the rotor disc already includes some ventilation structures, which are modified using a lattice. For example, FIG. 3C shows a side-on view of an intermediate disc 306c in which the ventilation space already includes grooves 314 defined within the rotor 300. In this case, the grooves 314 are defined by wedge shaped portions 316 of the intermediate portion 306c of the rotor, and at least a portion of the solid material of these wedge shaped portions 316 are replaced with a lattice. As another example, FIG. 3D shows a side-on view of an intermediate disc 306d in which the ventilation space already includes vanes 318 defined within the rotor 300. As shown in this example, the vanes 318 leave most of the intermediate disc 306d open (empty) for air flow inside the rotor 300. Even in such cases, one or more portions (or all) of the solid material of the previously defined vanes 318 is replaced with a lattice to further improve convective heat dissipation by the rotor 300.

As will be appreciated, many starting designs for the interior slice 306 of the rotor disc are possible. For example, the grooves 314 and the vanes 318 need not be straight radial lines, as shown, but can be curved grooves and vanes that direct air flow within the rotor 300 in a circular pattern. Moreover, in some implementations the ventilation space can be defined to exclude some portion of the pre-exiting design (e.g., exclude an inner portion of the vanes that initially direct air into the rotor), and in some implementations everything within the ventilation space (both solid and empty regions) is discarded and replaced by a rotationally symmetric lattice structure. In any case, a lattice is inserted to create more surface area within the rotor 300 for the air passing through the rotor 300, and the density of the inserted lattice is adjusted to fine tune the fluid turbulence within the rotor 300 in order to improve convective heat dissipation properties of the rotor 300.

The following examples focus on the case of replacing the straight vanes 318 of a rotor 300 for ease of illustration, but all of the systems and techniques described are applicable to more complicated internal structures for the rotor 300. In addition, the systems and techniques described are also applicable to other devices that pass fluids, such as water or air, through an internal structure to achieve heat dissipation. In general, turbulence in a fluid and surface area of a heat conducting material (e.g., metal) in contact with the fluid improves convective heat loss. Stagnation of fluid has a negative effect on convective heat loss, and lattice structures can be placed strategically on or in fluid (e.g., air or liquid) pathway(s) to improve turbulence and surface area while keeping negative effects due to fluid stagnation in check. An optimization process can fine tune the thickness of each and every lattice member subject to the loads and the prescribed boundary conditions of the ventilation space to ensure both weight efficiency and structural integrity are achieved while also improving convective heat loss for the device.

Figure 3E:
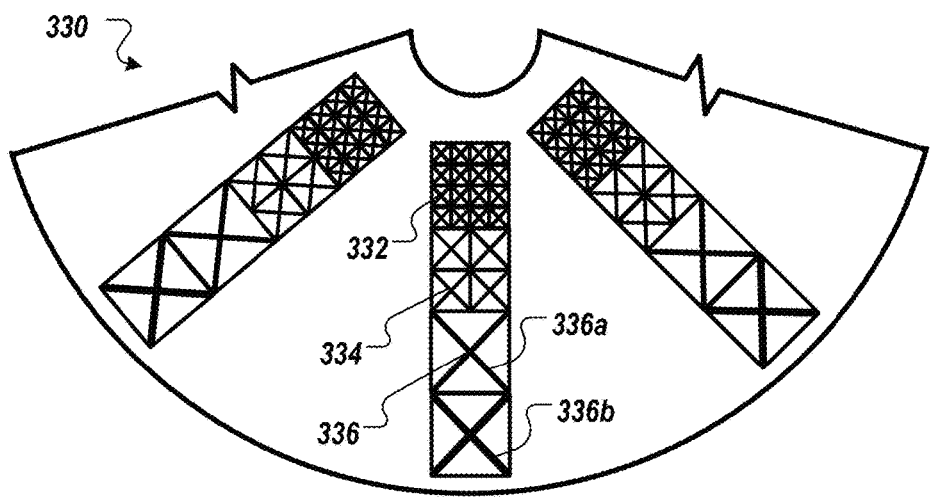
Figure 3F:
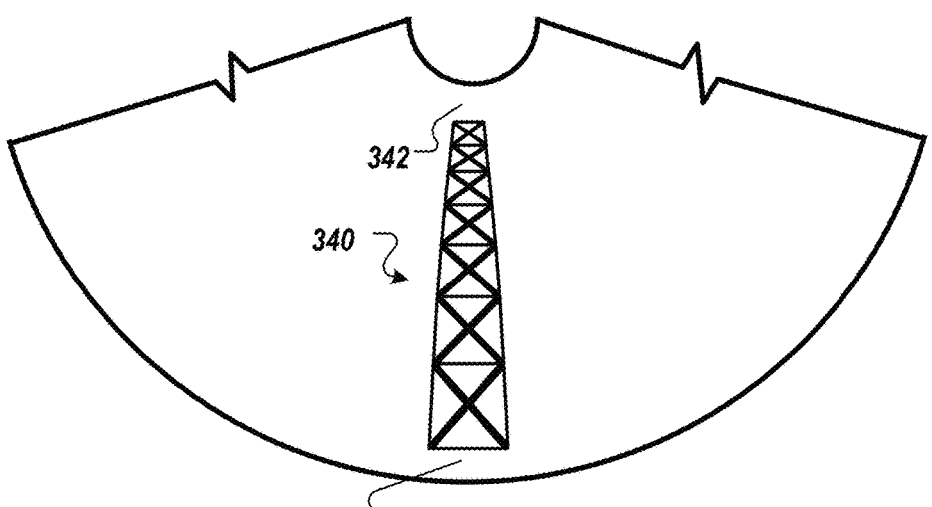

FIG. 3E shows a two dimensional (2D) representation of a portion 330 of a rotor, in which three vanes have been replaced with a lattice. It should be noted that the 2D representation is simplified to facilitate the clarity of this disclosure. For example, the lattice structures shown in FIGS. 3E & 3F are simple, 2D representations of an "X" shape within a grid, but those skilled in the art will understand that various types of 3D lattice topologies can be used. As shown, each vane has been replaced with a lattice composed of a lattice unit that has been reproduced multiple times to form the lattice, where each lattice unit includes beams within a lattice unit cell. In addition, the density of the lattice varies along at least one dimension of the disc brake rotor.

In the example shown, the lattice density varies along a radial dimension of the disc brake rotor. This is represented in FIG. 3E by showing the lattice as being composed of three distinct lattice unit sizes: a smallest lattice unit 332 (forming the highest density portion of the lattice), an intermediate lattice unit 334 (forming the next highest density portion of the lattice), and a largest lattice unit 336 (forming the lowest density portion of the lattice). However, as will be appreciated, this simple example is provided for ease of explanation only. The lattice need not be composed of a set number of distinct lattice unit sizes, and the density need not only increase in the direction of the center of the rotor, as shown. Rather, the lattice unit sizes can be adjusted in a continuous fashion in one or more portions of the ventilation space defined for the rotor, or continuously throughout the ventilation space defined for the rotor, as needed. For example, FIG. 3F shows a rotor vane that has been replaced by a set of lattice units 340, which vary continuously from an inner portion 342 of the rotor to an outer portion 344 of the rotor.

In addition, the density of each of two or more lattice unit cells of the lattice varies to provide additional structural support to the rotor where needed. For ease of illustration, only the largest unit cells in one vane in the rotor portion 330 in FIG. 3E are addressed here. As shown, the beams 336a of a first lattice unit have been thickened to increase the strength of this lattice unit, and the beams 336b of a second lattice unit have been thickened even more to further increase the strength of this lattice unit. This beam thickening is done in light of the computer simulation of the loading conditions that are expected for the rotor. Note that similar beam thickening can be made within the smallest lattice unit 332 portions of the rotor design, as well as in the intermediate lattice unit 334, in light of the computer simulation of the loading conditions. In general, and contrary to the simplified representation of FIG. 3E, the lattice density can vary from lattice unit to lattice unit, and the beam thicknesses can also vary from lattice unit to lattice unit, as needed to realize the cooling effect and necessary structural strength of the final rotor.

Nonetheless, the insertion of the lattice and the adjustments of the lattice should not result in a rotational imbalance that could adversely impact the operational performance of the rotor. This is achieved by ensuring that the lattice insertion replaces solid portions of the rotor in a rotationally symmetric manner, and also by ensuring that the lattice adjustments are applied in a rotationally symmetric manner. In practice, this is straight forward to achieve since both the insertion and the adjustments can be readily controlled in this fashion. Note that rotational symmetry is typically achieved as a natural result of the circular design of the rotor since the redesign approach follows the physics of the circular rotor design and so, for example, if a thermal issue occurs within a given location of the rotor design, the same thermal issue will generally occur at the radially opposite location of the rotor design. Thus, equal design changes are made in both radially opposite locations, thereby maintaining rotational symmetry.

Figure 3G:
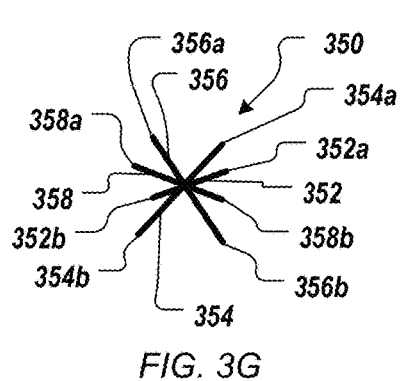

As noted above, in some implementations, only self-supporting lattice topologies are used, where "self-supporting" refers to the lattice material not needing extra support material during additive manufacturing of the lattice structure. FIG. 3G shows a lattice unit 350 for an X lattice topology, in which the lattice unit is composed of four beams 352, 354, 356, 358 that each form an (initial) angle of forty five degrees with a horizontal plane (e.g., the horizontal plane associated with planned 3D printing of the rotor). The beams 352, 354, 356, 358 connect the corners of the lattice unit as follows: beam 352 connects corner points 352a, 352b; beam 354 connects corner points 354a, 354b; beam 356 connects corner points 356a, 356b; and beam 358 connects corner points 358a, 358b.

Figure 3H:
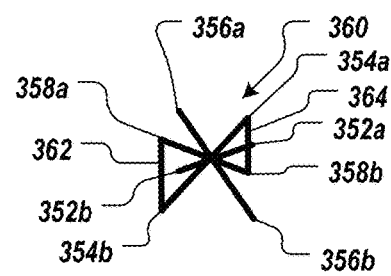

FIG. 3H shows a lattice unit 360 for a star topology, in which the lattice unit is composed of six beams, including the same four beams used in the X topology, plus two additional beams 362, 364 that are each (initially) perpendicular to the horizontal plane (e.g., the horizontal plane associated with planned 3D printing of the rotor). The beams 362, 364 connect the corners of the lattice unit as follows: beam 362 connects corner points 358a, 354b; and beam 364 connects corner points 354a, 358b. Moreover, these initial shapes can be skewed, as noted above, and so the repeated and resized lattice unit need not be a cube, but rather can be a cuboid or a hexahedron.

Figure 3I:
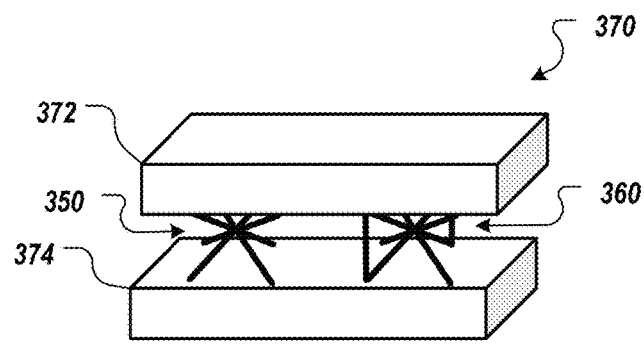

In addition, rather than using more than one lattice unit in the vertical direction, the lattice unit can be sized and reproduced so as to form a lattice that is a single layer lattice inside the rotor. For example, FIG. 3I shows a cutaway portion 370 of a rotor, which includes the lattice unit 350 and the lattice unit 360 resized to fill the vertical portion of the ventilation space between the inner disc 372 and the outer disc 374 of the rotor. The adjustment of lattice density can then be achieved by changing the sizes of the lattice units in only the lateral (X & Y) dimensions, while maintaining the size of the lattice units in the vertical (Z) dimension.

Figure 3J:
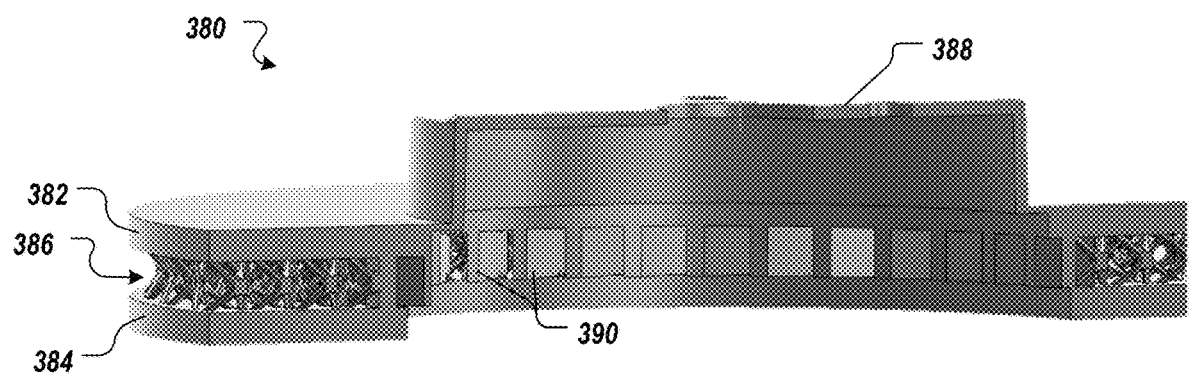

As another example of such a single layer lattice, FIG. 3J shows a cutaway portion of a rotor 380 that has been redesigned to include a single layer lattice 386 coupled between the inner disc 382 and the outer disc 384. The single layer lattice 386 is composed of the star lattice unit, which has been reproduced multiple times to form the single layer lattice 386 between the inner disc 382 and the outer disc 386. In addition, the density of the single layer lattice 386 varies along both of the lateral dimensions (X & Y) of the disc brake rotor 380 so as to improve heat convection properties of the disc brake rotor 380, but the density of the single layer lattice 386 does not vary in the vertical (Z) dimension. Moreover, a density of each of two or more lattice unit cells of the single layer lattice 386 (i.e., the thickness of the beams forming the single layer lattice 386) varies to provide additional structural support where needed in the disc brake rotor 380. Finally, in this example, the inner disc 382, the outer disc lattice 384, the lattice 386, and also a hub 388 and fins 390 are all a single integral structure formed using an additive manufacturing technique.

While self-supporting lattice structures are often beneficial when using additive manufacturing, they are not required. In some cases, a grid lattice topology may be more meaningful due to geometric shape and lower complexity with 3d printing, and for some additive manufacturing systems (e.g., using granular techniques) there is no concern with support for the object being manufactured, or the support material can be removed after manufacture. Thus, lattice topology and orientation can be taken into consideration in view of the manufacturing technique(s) that are to be used for the rotor. Moreover, many different types of beams can be used (both in terms of cross-section shapes and in terms of allowed variation in dimensions) in the same lattice. For further details regarding various types of lattice geometries, see: US Pub. No. 2016-0209820, published on Jul. 21, 2016; US Pub. No. 2016-0232262, published on Aug. 11, 2016; and PCT App. No. EP2017-059918, filed on Apr. 26, 2017, and published on a date to be determined; each of these applications is hereby incorporated by reference.

Figure 4:
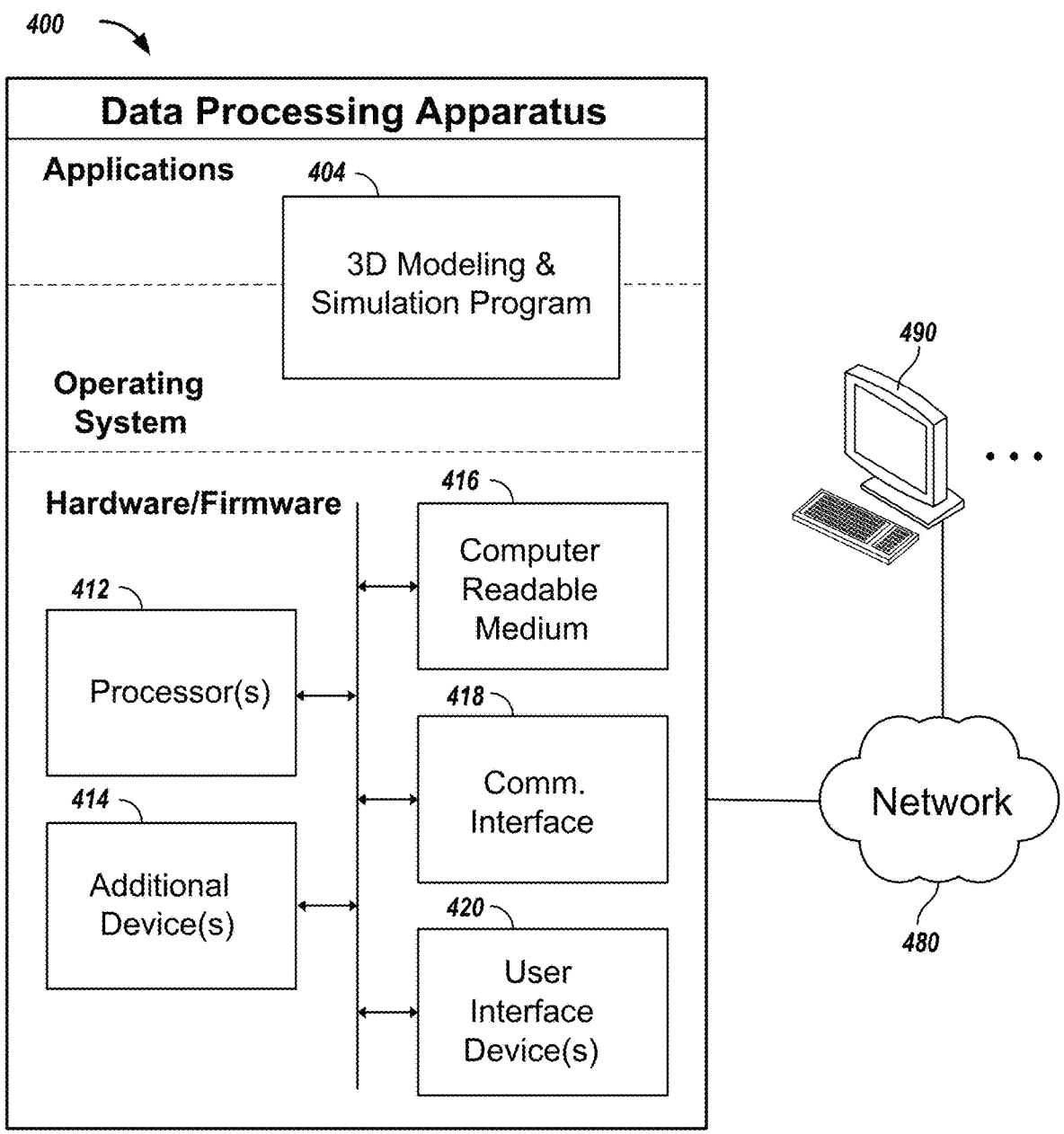
FIG. 4 is a schematic diagram of a data processing system usable to implement the described systems and techniques.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of a 3D modeling and simulation program 404, such as described above. The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses its communication interface 418 to communicate with one or more computers 490, for example, over a network 480. Examples of user interface devices 420 include a display, a camera, a speaker, a microphone, a tactile feedback device, a keyboard, and a mouse. The data processing apparatus 400 can store instructions that implement operations associated with the program(s) described above, for example, on the computer readable medium 416 or one or more additional devices 414, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
   placing a lattice structure in a ventilation space within a three dimensional model of a disc brake rotor to create more internal surface area within the disc brake rotor between an inner disc of the rotor and an outer disc of the rotor;
   adjusting a number of lattice unit cells for the lattice structure in first regions of the three dimensional model of the disc brake rotor between the inner disc and the outer disc of the rotor, based on first results from fluid dynamics simulation using the three dimensional model of the disc brake rotor, to increase air turbulence in the ventilation space within the disc brake rotor to provide a desired heat loss;
   adjusting one or more thicknesses of beams forming the lattice structure in second regions of the three dimensional model of the disc brake rotor between the inner disc and the outer disc of the rotor, based on second results from structural integrity simulation using predefined loading conditions and the three dimensional model of the disc brake rotor after adjustment of the number of lattice unit cells, to prevent structural failure of the disc brake rotor under the predefined loading conditions; and providing an updated version of the three dimensional model of the disc brake rotor that incorporates the lattice structure after adjustment of the number of lattice unit cells and the one or more thicknesses of beams forming the lattice structure.

2. The method of claim 1, wherein placing the lattice structure comprises:
selecting a lattice topology for the lattice structure, wherein the lattice topology is self-supportable during additive manufacturing;
orienting the selected lattice topology with respect to the disc brake rotor; and
inserting the selected lattice topology within the ventilation space to form the lattice structure.

3. The method of claim 1, wherein placing the lattice structure comprises replacing at least a portion of multiple vanes previously defined for the disc brake rotor with the lattice structure.

4. The method of claim 1, comprising operating a computational fluid dynamics simulation program to identify one or more first regions between the inner disc and the outer disc where air flow tends to stagnate, and wherein adjusting the number of lattice unit cells for the lattice structure comprises reducing the number of lattice unit cells for the lattice structure in the one or more first regions.

5. The method of claim 4, wherein adjusting the number of lattice unit cells for the lattice structure comprises increasing the number of lattice unit cells for the lattice structure in one or more other regions, between the inner disc and the outer disc, identified by the computational fluid dynamics simulation program as where air flows freely.

6. The method of claim 5, wherein adjusting the one or more thicknesses of beams forming the lattice structure comprises adjusting the one or more thicknesses based on results from simulation using a computational structural simulation program to avoid stress and buckling failure.

7. The method of claim 6, comprising:
validating the desired heat loss of the updated version of the three dimensional model of the disc brake rotor, with an adjusted lattice structure output from the computational structural simulation program, using the computational fluid dynamics simulation program; and
repeating the adjusting of the number of lattice unit cells and the adjusting of the one or more thicknesses of beams forming the lattice structure until the updated version of the three dimensional model of the disc brake rotor is validated for the desired heat loss.

8. The method of claim 6, wherein the computational fluid dynamics simulation program and the computational structural simulation program are each included within a computer aided design (CAD) program, and the method comprises building the disc brake rotor using an additive manufacturing machine.

9. A disc brake rotor comprising:
a mount configured to be coupled with an axle of a vehicle;
an inner disc and an outer disc coupled with the mount; and
a lattice coupled between the inner disc and the outer disc;
wherein the lattice comprises a lattice unit that has been reproduced multiple times to form a lattice structure of the lattice between the inner disc and the outer disc, the lattice unit comprising beams that cross each other within a lattice unit cell;
wherein a density of the lattice varies along at least one dimension of the disc brake rotor, in accordance with first results from fluid dynamics simulation, so as to improve heat convection properties of the disc brake rotor by increasing air turbulence in ventilation space within the disc brake rotor; and
wherein one or more thicknesses of beams forming the lattice structure varies, in accordance with second results from structural integrity simulation, to prevent structural failure of the disc brake rotor under predefined loading conditions.

10. The disc brake rotor of claim 9, wherein the inner disc, the outer disc, and the lattice are a single integral structure formed by an additive manufacturing technique.

11. The disc brake rotor of claim 9, wherein the lattice is a single layer of the reproduced lattice unit between the inner disc and the outer disc, and the density of the lattice varies within the single layer along a radial dimension of the disc brake rotor.

12. The disc brake rotor of claim 9, wherein the lattice unit comprises four beams that each form an angle of 45 degrees with a horizontal plane.

13. A system comprising:
a data processing apparatus including at least one hardware processor; and
a non-transitory computer-readable medium encoding instructions, the non-transitory computer-readable medium being coupled with the data processing apparatus;
wherein the non-transitory computer-readable medium encodes the instructions configured to cause the data processing apparatus to place a lattice structure in a ventilation space within a three dimensional model of a disc brake rotor to create more internal surface area within the disc brake rotor between an inner disc of the rotor and an outer disc of the rotor, adjust a number of lattice unit cells for the lattice structure in first regions of the three dimensional model of the disc brake rotor between the inner disc and the outer disc of the rotor, based on first results from fluid dynamics simulation using the three dimensional model of the disc brake rotor, to increase air turbulence in the ventilation space within the disc brake rotor to provide a desired heat loss, adjust one or more thicknesses of beams forming the lattice structure in second regions of the three dimensional model of the disc brake rotor between the inner disc and the outer disc of the rotor, based on second results from structural integrity simulation using predefined loading conditions and the three dimensional model of the disc brake rotor after adjustment of the number of lattice unit cells, to prevent structural failure of the disc brake rotor under the predefined loading conditions, and provide an updated version of the three dimensional model of the disc brake rotor that incorporates the lattice structure after adjustment of the number of lattice unit cells and the one or more thicknesses of beams forming the lattice structure.

14. The system of claim 13, wherein the non-transitory computer-readable medium encodes the instructions configured to cause the data processing apparatus to place the lattice structure in the ventilation space by selecting a lattice topology for the lattice structure, wherein the lattice topology is self-supportable during additive manufacturing, orienting the selected lattice topology with respect to the disc brake rotor, and inserting the selected lattice topology within the ventilation space to form the lattice structure.

15. The system of claim 13, wherein the non-transitory computer-readable medium encodes the instructions configured to cause the data processing apparatus to place the lattice structure in the ventilation space by replacing at least a portion of multiple vanes previously defined for the disc brake rotor with the lattice structure.

16. The system of claim 13, wherein the instructions encoded in the non-transitory computer-readable medium comprise instructions of a computational fluid dynamics simulation program used to identify one or more first regions between the inner disc and the outer disc where air flow tends to stagnate, and wherein the number of lattice unit cells are adjusted for the lattice structure by reducing the number of lattice unit cells for the lattice structure in the one or more first regions.

17. The system of claim 16, wherein the non-transitory computer-readable medium encodes the instructions configured to cause the data processing apparatus to adjust the number of lattice unit cells by increasing the number of lattice unit cells for the lattice structure in one or more other regions, between the inner disc and the outer disc, identified by the computational fluid dynamics simulation program as where air flows freely.

18. The system of claim 17, wherein the instructions encoded in the non-transitory computer-readable medium comprise instructions of a computational structural simulation program used to adjust the one or more thicknesses of beams forming the lattice structure to avoid stress and buckling failure.

19. The system of claim 18, wherein the instructions encoded in the non-transitory computer-readable medium comprise instructions configured to cause the data processing apparatus to:
   validate the desired heat loss of the updated version of the three dimensional model of the disc brake rotor, with an adjusted lattice structure output from the computational structural simulation program, using the computational fluid dynamics simulation program; and
   repeat adjustment of the number of lattice unit cells and adjustment of the one or more thicknesses of beams forming the lattice structure until the updated version of the three dimensional model of the disc brake rotor is validated for the desired heat loss.

20. The system of claim 18, comprising an additive manufacturing machine used to build the disc brake rotor.

* * * * *